(12) United States Patent
Cook

(10) Patent No.: US 10,524,464 B1
(45) Date of Patent: Jan. 7, 2020

(54) MOUSE TRAP

(71) Applicant: Paul F. Cook, Champaign, IL (US)

(72) Inventor: Paul F. Cook, Champaign, IL (US)

(*) Notice: Subject to any disclaimer, the term of this patent is extended or adjusted under 35 U.S.C. 154(b) by 0 days.

(21) Appl. No.: 16/293,846

(22) Filed: Mar. 6, 2019

(51) Int. Cl.
*A01M 23/30* (2006.01)
*A01M 23/24* (2006.01)

(52) U.S. Cl.
CPC .......... *A01M 23/30* (2013.01); *A01M 23/245* (2013.01)

(58) Field of Classification Search
CPC ..... A01M 23/24; A01M 23/245; A01M 23/30
USPC .................. 43/77, 81, 81.5, 82, 83
See application file for complete search history.

(56) References Cited

U.S. PATENT DOCUMENTS

| | | | | |
|---|---|---|---|---|
| 528,671 A | | 11/1894 | Hooker | |
| 1,499,193 A | * | 6/1924 | Plants | A01M 23/30 43/81 |
| 1,998,419 A | * | 4/1935 | Fuchs | A01M 23/30 43/83 |
| 2,188,297 A | * | 1/1940 | Graybill Hershey | A01M 23/30 43/81 |
| 2,581,628 A | * | 1/1952 | Burwell | A01M 23/30 43/81 |
| 3,055,140 A | | 9/1962 | McAllister | |
| 3,769,742 A | | 11/1973 | Spain et al. | |
| 3,823,505 A | * | 7/1974 | Holt | A01M 23/30 43/81.5 |
| 4,306,369 A | * | 12/1981 | Margulies | A01M 23/30 43/81 |
| 4,803,799 A | * | 2/1989 | Vajs | A01M 23/30 43/82 |
| 5,337,512 A | * | 8/1994 | Krenzler | A01M 23/30 43/81 |
| 6,655,077 B1 | | 12/2003 | Trevino | |

FOREIGN PATENT DOCUMENTS

| | | | | |
|---|---|---|---|---|
| DE | 620945 C | * | 10/1935 | ............ A01M 23/30 |
| GB | 210075 A | * | 7/1924 | ............ A01M 23/30 |
| GB | 381280 A | * | 10/1932 | ............ A01M 23/30 |

* cited by examiner

*Primary Examiner* — Lisa L Tsang
(74) *Attorney, Agent, or Firm* — Philip L. Bateman

(57) ABSTRACT

A mouse trap has a spring-loaded striker that is released when the mouse depresses a trigger. The trigger with has recesses near the distal end of the trigger and has a latch having an enlargement at its distal end. The enlargement contains a groove that engages a lower corner of the trigger when the mouse trap is armed.

1 Claim, 3 Drawing Sheets

US 10,524,464 B1

MOUSE TRAP

FIELD OF THE INVENTION

This invention relates to vermin traps. More particularly, this invention relates to mouse traps having a swinging striker.

BACKGROUND OF THE INVENTION

Mouse traps (also spelled "mousetraps") are widely used to capture and kill mice. The most common type of mouse trap contains a spring-loaded striker that is released when the mouse depresses a trigger. Similar but larger traps are used for rats, chipmunks, moles, and other vermin. The term "mouse trap" is used herein to include all such spring-loaded animal traps, regardless of size. The term "mouse" is used herein to include all small vermin.

Hooker, U.S. Pat. No. 528,671, Nov. 6, 1894, discloses a mouse trap that is similar to the mouse traps widely sold today. Referring to FIGS. 1 and 2, the mouse trap 10 comprises a wooden base (also known as a platform) 20, a swinging striker (also known as a hammer) 30 consisting of a rectangular shaped metal wire, a helical spring 40 through which the base side of the swinging striker passes and having one extended end that contacts the base and one extended end that overlaps one of the sides of the swinging striker, a metal or thermoplastic trigger (also known as a trip) 50, and a latch (also known as a retainer bar or hold-down bar) 60. The mouse trap is shown in its unarmed (rest) position in FIG. 1 and in its armed (set) position in FIG. 2.

The mouse trap is armed by first placing food or other attractant serving as bait on the trigger. The striker is then moved 180 degrees against the force of the spring and held in place with the hand. The trigger is then raised slightly and the latch is placed over the striker to engage the trigger. The striker is then released. The spring forces the striker upwardly which, in turn, forces the latch upwardly against the slightly raised trigger to hold it in place. When the trigger is depressed by the mouse, the latch disengages, and the striker swings violently onto the mouse.

Many variations of the Hooker mouse trap have since been disclosed. For example, McAllister, U.S. Pat. No. 3,055,140, Sep. 25, 1962, discloses a mouse trap with a bowl shaped catch that is used without a food bait; Spain et al., U.S. Pat. No. 3,769,742, Nov. 6, 1973, discloses a mouse trap with a plastic bag for holding the dead mouse; and Trevino, U.S. Pat. No. 6,655,077, Dec. 2, 2003, discloses a mouse trap with a rotating latch.

Although the basic design of the mouse trap has remained unchanged for over a century, latching and unlatching of the trigger continues to cause problems. If the latching is not secure enough, the striker can accidentally hit the fingers of the person arming the mouse trap. If the latching is too secure, the striker is not released when the mouse contacts the trigger. The mouse trap shown in FIGS. 1 and 2 has a latching mechanism that is variable and that is sometimes not secure enough and sometimes too secure. Referring to FIG. 3, if the distal end of the latch is placed too close to the proximate end of the trigger, it can release too easily. Referring to FIG. 4, if the distal end of the latch is placed too far under the proximate end of the trigger, it may not release even when a mouse contacts the distal end of the trigger.

Accordingly, there is a demand for an improved mousetrap. More particularly, there is a demand for a mouse trap that has a latching mechanism that latches exactly the same every time, that is less likely to accidentally release, and that is more likely to release when a mouse contacts the trigger.

SUMMARY OF THE INVENTION

The general object of this invention is to provide an improved mouse trap. A more particular object is to provide a mouse trap that has a latching mechanism that latches exactly the same every time, that is less likely to accidentally release, and that is more likely to release when a mouse contacts the trigger.

I have invented an improved mouse trap. The mouse trap comprises: (a) a generally rectangular base having a transverse midpoint dividing the base into an unarmed side and an armed side with an end; (b) a swinging striker having a proximate end pivotably attached to the midpoint of the base and resting on the unarmed side of the base when the mouse trap is in the unarmed position and suspended above the armed side of the base when the mouse trap is in the armed position; (c) a helical spring attached to the base at the midpoint biasing the striker toward the unarmed position; (d) a trigger having a proximate end and a distal end, the proximate end having a lower surface and being pivotably attached to the unarmed side of the base adjacent the helical spring, the distal end of the trigger having one or more recesses for receiving a bait; and (e) a latch having a proximate end and a distal end, the proximate end being pivotably attached at the end of the armed side of the base and the distal end having an enlargement with a groove for engaging the lower surface of the trigger when the mouse trap is in the armed position.

The mouse trap of this invention has a latching mechanism that latches exactly the same every time, that is less likely to accidentally release, and that is more likely to release when a mouse contacts the trigger.

DETAILED DESCRIPTION OF THE INVENTION

Figure 3:
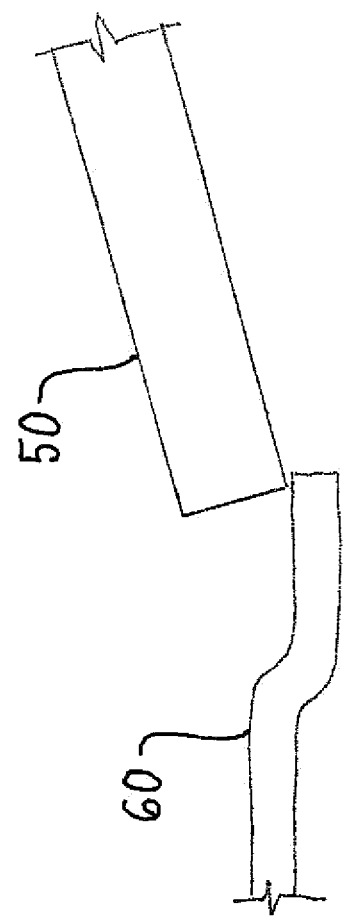
FIG. 3 is a detailed side elevation view thereof showing the distal end of the latch and the proximate end of the trigger in a first armed position.
Figure 1:
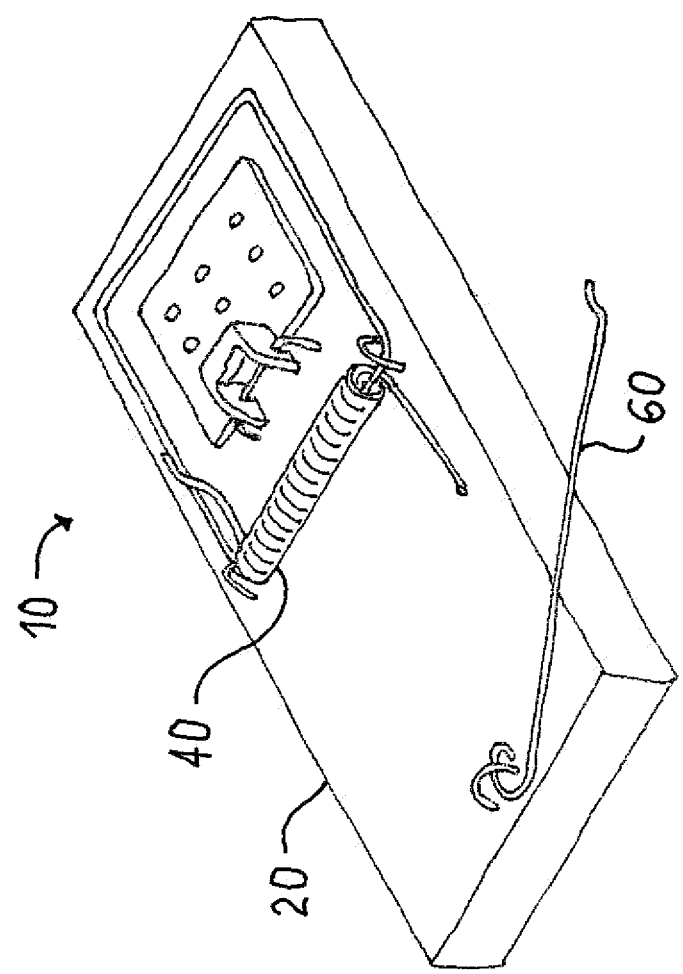
FIG. 1 is a perspective view of a prior art mouse trap in the unarmed position.
Figure 4:
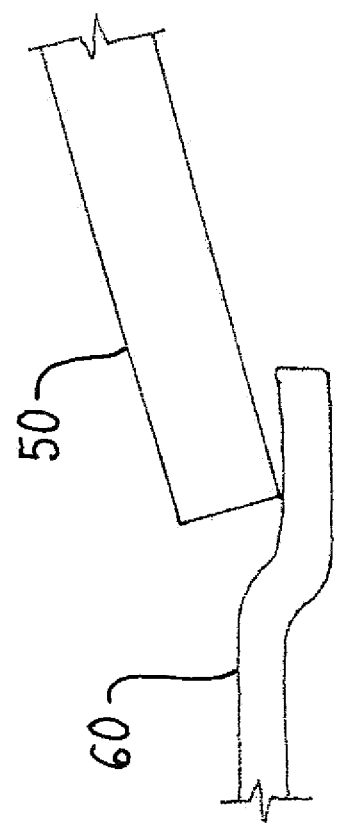
FIG. 4 is a detailed side elevation view thereof showing the distal end of the latch and the proximate end of the trigger in a second armed position.
Figure 2:
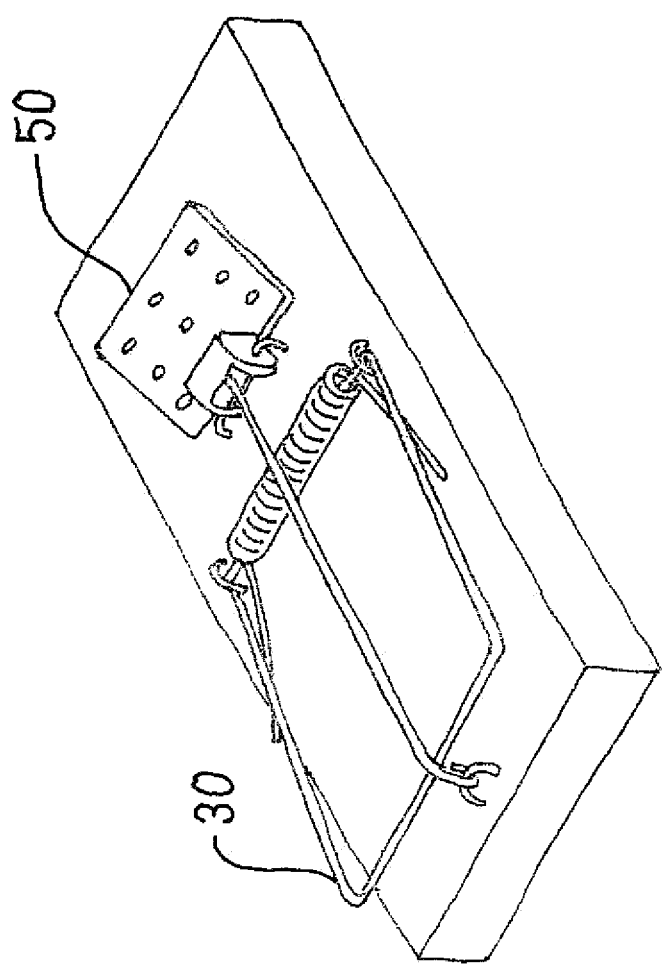
FIG. 2 is a perspective view thereof in the armed position.
Figure 5:
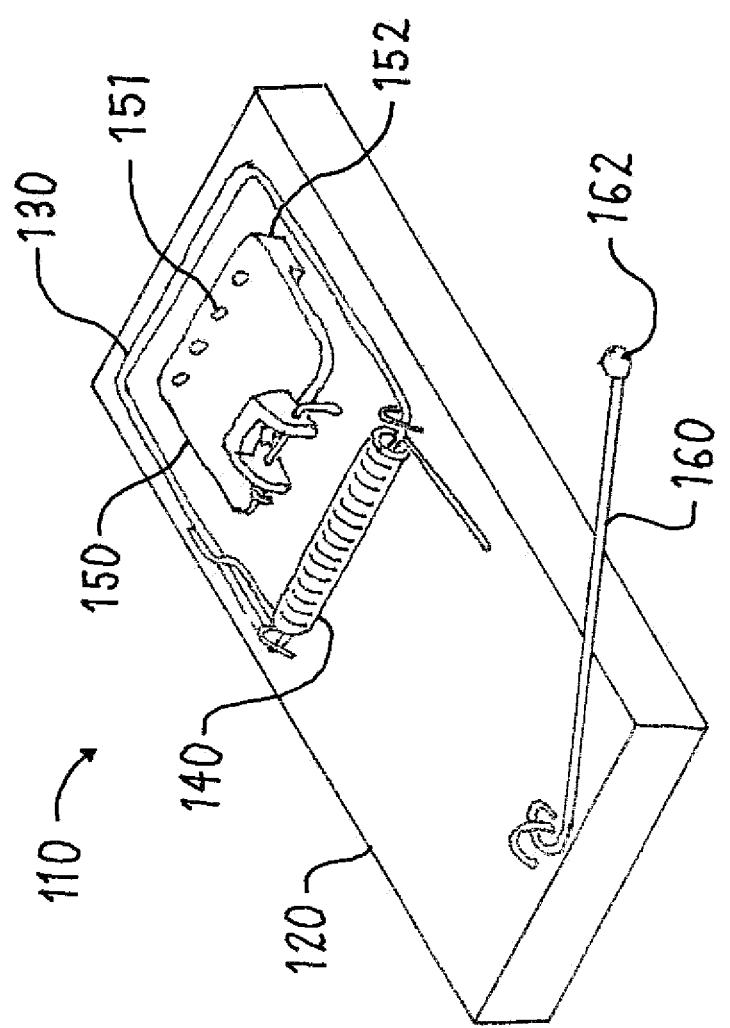
FIG. 5 is a perspective view of a preferred embodiment of the mouse trap of this invention.

This invention is best understood by reference to the drawings. Referring to FIG. 5, a preferred embodiment of the mouse trap 110 of this invention is shown in the unarmed position. The mouse trap comprises a base 120, a striker 130, a helical spring 140, a trigger 150, and a latch 160. The base, striker, and helical spring are conventional and are, therefore, described in only the most cursory manner. The base is generally rectangular and made of wood. The striker is biased by the helical spring from an armed position to an unarmed position. The helical spring is generally located transversely on the base at the midpoint. The helical spring thus divides the base into two generally equal sized sides. The side on which the striker rests when the mouse trap is unarmed is known as the unarmed side. The side above which the striker is suspended when the mouse trap is armed is known as the armed side. The trigger and latch of the mouse trap of this invention are novel and are discussed in more detail below.

The trigger 150 is pivotably attached at its proximate end to the base on the unarmed side adjacent the helical spring. The trigger generally has one or more downwardly-opening slots that frictionally fit onto a lengthened staple in the base to provide the pivoting action. The trigger serves several functions. First, it holds the bait that attracts the mouse to the mouse trap. Second, when the mouse trap is armed, the trigger (in cooperation with the latch) secures the striker in the armed position. Third, when the trigger is depressed, it releases the latch to allow the striker to swing onto the mouse.

The trigger contains one or more recesses 151 for receiving the bait (food that is attractive to mice, such as peanut butter, or other attractant). The trigger preferably contains a plurality of recesses and they are preferably arranged in one or more rows spanning substantially all the width of the trigger. The recesses are preferably located near the distal end of the trigger. The mouse is most likely to contact the trigger at the recesses and the maximum leverage is applied to the trigger by the mouse when the contact is made close to the distal end of the trigger. Accordingly, locating the recesses as near as practical to the distal end maximizes the likelihood that the trigger will move and release the striker. The recesses are most preferably located in the outermost quarter of the trigger, i.e., within the quarter of the length closest to the distal end of the trigger. For example, if the trigger is two inches in length, the recesses are all preferably located in the half inch closest to the distal end.

To further maximize the likelihood of the trigger being moved and releasing the striker, the trigger preferably contains extra mass (weight) at its distal end. In the preferred embodiment shown, the extra mass is added in the form of a downwardly extending base 152 on the lower surface (underside) of the trigger and in the outermost quarter of the trigger (the quarter of the length closest to the distal end of the trigger).

Figure 6:
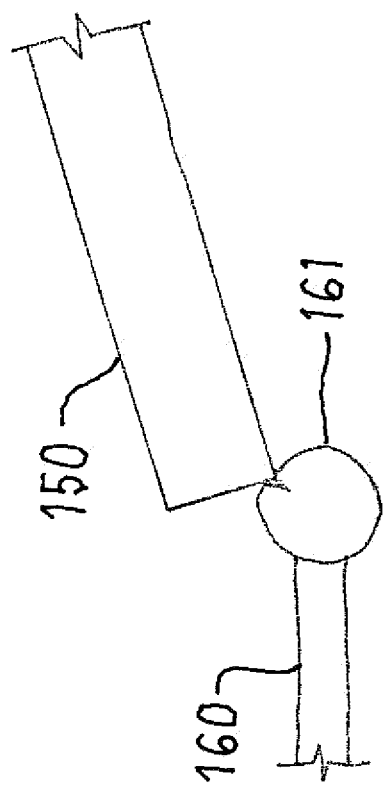
FIG. 6 is a detailed side elevation view thereof showing the distal end of the latch and the proximate end of the trigger in the armed position.

The latch 160 is pivotably attached at its proximate end to the base at the outer end of the armed side. The proximate end of the latch generally is formed into an eye that is attached to a staple in the base to provide the pivoting action. The distal end of the latch is enlarged and the enlargement 161 contains a groove 162. The term "groove" is used herein to refer to any indentation in the enlargement into which a portion of the trigger fits. The enlargement is generally spherical, but other shapes are also suitable. The groove is generally linear, but other shapes are also suitable. For example, a suitable groove in the enlargement is a rounded recess into which a projecting boss on the trigger fits. When the mouse trap is armed, the groove engages the proximate end of the trigger. As seen in FIG. 6, the groove of the preferred embodiment engages a right-angled outside corner on the lower surface of the trigger. The groove and mating portion of the trigger ensure that exactly the same amount of force is required to release the latch.

The use of the mouse trap of this invention can now be considered. The mouse trap is baited and armed in the same way as a conventional mouse trap, except that the groove of the latch enlargement is positioned precisely on the edge of the trigger every time.

The mouse trap of this invention is superior to conventional mouse traps. Its latching mechanism (the interaction of the trigger and the latch) latches exactly the same every time, is less likely to accidentally release, and is more likely to release when a mouse contacts the trigger.

I claim:

1. A mouse trap having an unarmed position and an armed position, the mouse trap comprising:
    (a) a base having a transverse midpoint dividing the base into an unarmed side and an armed side with an end;
    (b) a swinging striker having a proximate end pivotably attached to the midpoint of the base and resting on the unarmed side of the base when the mouse trap is in the unarmed position and suspended above the armed side of the base when the mouse trap is in the armed position;
    (c) a helical spring attached to the base at the midpoint biasing the striker toward the unarmed position;
    (d) a trigger having a proximate end and a distal end, the proximate end having a lower surface and being pivotably attached to the unarmed side of the base adjacent the helical spring, the distal end of the trigger having one or more recesses for receiving a bait; and
    (e) an elongated cylindrical latch having a proximate end and a distal end, the proximate end being pivotably attached at the end of the armed side of the base and the distal end having an enlargement that is a sphere with an upwardly facing surface and a groove on the upwardly facing surface for engaging the lower surface of the trigger when the mouse trap is in the armed position.

* * * * *